(12) United States Patent
Peleg et al.

(10) Patent No.: US 11,790,515 B2
(45) Date of Patent: Oct. 17, 2023

(54) DETECTING DEFECTS IN SEMICONDUCTOR SPECIMENS USING WEAK LABELING

(71) Applicant: Applied Materials Israel Ltd., Rehovot (IL)

(72) Inventors: Irad Peleg, Tel Aviv (IL); Ran Schleyen, Rehovot (IL); Boaz Cohen, Lehavim (IL)

(73) Assignee: Applied Materials Israel Ltd., Rehovot (IL)

( * ) Notice: Subject to any disclaimer, the term of this patent is extended or adjusted under 35 U.S.C. 154(b) by 0 days.

(21) Appl. No.: 17/751,507

(22) Filed: May 23, 2022

(65) Prior Publication Data

US 2022/0301151 A1 Sep. 22, 2022

Related U.S. Application Data

(63) Continuation of application No. 16/892,139, filed on Jun. 3, 2020, now Pat. No. 11,379,972.

(51) Int. Cl.
*G06T 7/00* (2017.01)
*G06T 7/11* (2017.01)
(Continued)

(52) U.S. Cl.
CPC ....... *G06T 7/0004* (2013.01); *G01N 21/9501* (2013.01); *G06F 18/214* (2023.01);
(Continued)

(58) Field of Classification Search
CPC ....... G06T 7/0004; G06T 7/0008; G06T 7/11; G06T 2207/10061; G06T 2207/20084;
(Continued)

(56) References Cited

U.S. PATENT DOCUMENTS

| 7,570,796 B2 | 8/2009 | Zafar et al. |
| 7,676,077 B2 | 3/2010 | Kulkarni et al. |

(Continued)

OTHER PUBLICATIONS

Sukhbaatar et al., "Learning from noisy labels with deep neural networks," 2014, arXiv preprint arXiv:1406.2080, 2(3), 4.
(Continued)

*Primary Examiner* — Mia M Thomas
(74) *Attorney, Agent, or Firm* — Lowenstein Sandler LLP

(57) ABSTRACT

A system for classifying a pattern of interest (POI) on a semiconductor specimen is disclosed. The system comprises a processor and memory circuitry. The memory circuitry is configured to obtain a high-resolution image of the POI, and to generate data usable for classifying the POI in accordance with a defectiveness-related classification. To generate the data, a machine learning model is utilized that has been trained in accordance with training samples. The training samples include a high-resolution training image captured by scanning a respective training pattern on a specimen, the respective training pattern being similar to the POI. The training samples also include a label associated with the image, the label being derivative of low-resolution inspection of the respective training pattern.

20 Claims, 5 Drawing Sheets

(51) Int. Cl.
*G06F 18/22* (2023.01)
*G06F 18/214* (2023.01)
*G06V 10/82* (2022.01)
*G06V 10/44* (2022.01)
*G06V 20/69* (2022.01)
*G01N 21/95* (2006.01)
*G06N 3/06* (2006.01)

(52) U.S. Cl.
CPC ............... *G06F 18/22* (2023.01); *G06N 3/06* (2013.01); *G06T 7/0008* (2013.01); *G06T 7/11* (2017.01); *G06V 10/454* (2022.01); *G06V 10/82* (2022.01); *G06V 20/69* (2022.01); *G06T 2207/10061* (2013.01); *G06T 2207/20084* (2013.01); *G06T 2207/30148* (2013.01)

(58) Field of Classification Search
CPC ........... G06T 2207/30148; G06T 2207/20081; G01N 21/9501; G06F 18/214; G06F 18/22; G06N 3/06; G06N 3/045; G06N 3/044; G06N 3/084; G06N 20/00; G06V 3/08; G06V 10/454; G06V 10/82; G06V 20/69; H01L 22/12
See application file for complete search history.

(56) References Cited

U.S. PATENT DOCUMENTS

| | | | |
|---|---|---|---|
| 9,171,364 B2 | 10/2015 | Wu et al. | |
| 9,390,490 B2 | 7/2016 | Takagi et al. | |
| 9,714,905 B1* | 7/2017 | Plihal | G05B 19/41875 |
| 9,892,503 B2* | 2/2018 | Guan | G01N 21/956 |
| 9,964,607 B1 | 5/2018 | Propes et al. | |
| 10,359,371 B2 | 7/2019 | Duffy et al. | |
| 10,410,338 B2 | 9/2019 | Lee et al. | |
| 10,451,563 B2* | 10/2019 | Sousa | G01N 21/8851 |
| 10,620,135 B2 | 4/2020 | Brauer | |
| 11,138,507 B2 | 10/2021 | Asbag et al. | |
| 11,151,710 B1* | 10/2021 | Schleyen | G06T 7/0004 |
| 11,244,442 B2* | 2/2022 | Lee | G06T 7/001 |
| 2006/0017014 A1* | 1/2006 | Shinada | H01J 37/244 250/492.1 |
| 2009/0231424 A1 | 9/2009 | Honda et al. | |
| 2010/0158345 A1 | 6/2010 | Kitamura et al. | |
| 2010/0215247 A1 | 8/2010 | Kitamura et al. | |
| 2012/0298862 A1 | 11/2012 | Chen et al. | |
| 2013/0343632 A1* | 12/2013 | Urano | G06T 7/001 382/149 |
| 2014/0219544 A1 | 8/2014 | Wu et al. | |
| 2015/0012900 A1 | 1/2015 | Shifrin et al. | |
| 2015/0262038 A1* | 9/2015 | Konuru | G06F 18/41 382/149 |
| 2016/0314578 A1 | 10/2016 | Banerjee et al. | |
| 2017/0337673 A1 | 11/2017 | Tseng et al. | |
| 2018/0130195 A1 | 5/2018 | Uppaluri et al. | |
| 2019/0257767 A1* | 8/2019 | Shaubi | G06T 7/0004 |
| 2020/0074610 A1 | 3/2020 | Pu et al. | |
| 2020/0211178 A1 | 7/2020 | Zhou et al. | |
| 2020/0234417 A1 | 7/2020 | Cohen et al. | |
| 2020/0294224 A1* | 9/2020 | Shaubi | G06N 3/045 |
| 2020/0327652 A1 | 10/2020 | Vereschagin et al. | |
| 2021/0383530 A1* | 12/2021 | Peleg | G06T 7/0008 |
| 2022/0044949 A1* | 2/2022 | Korb | G06F 18/214 |

OTHER PUBLICATIONS

Zhou et al., "Weakly supervised instance segmentation using class peak response," 2018, pp. 3791-3800, In Proceedings of the IEEE Conference on Computer Vision and Pattern Recognition.
Rolnick, et al., "Deep learning is robust to massive label noise," 2017, arXiv preprint arXiv:1705.10694.
Yang et al., "Weakly-Supervised Learning for Attention-Guided Skull Fracture Classification In Computed Tomography Imaging." Sep. 2019, pp. 1337-1341. In 2019 IEEE International Conference on Image Processing (ICIP), IEEE.

* cited by examiner

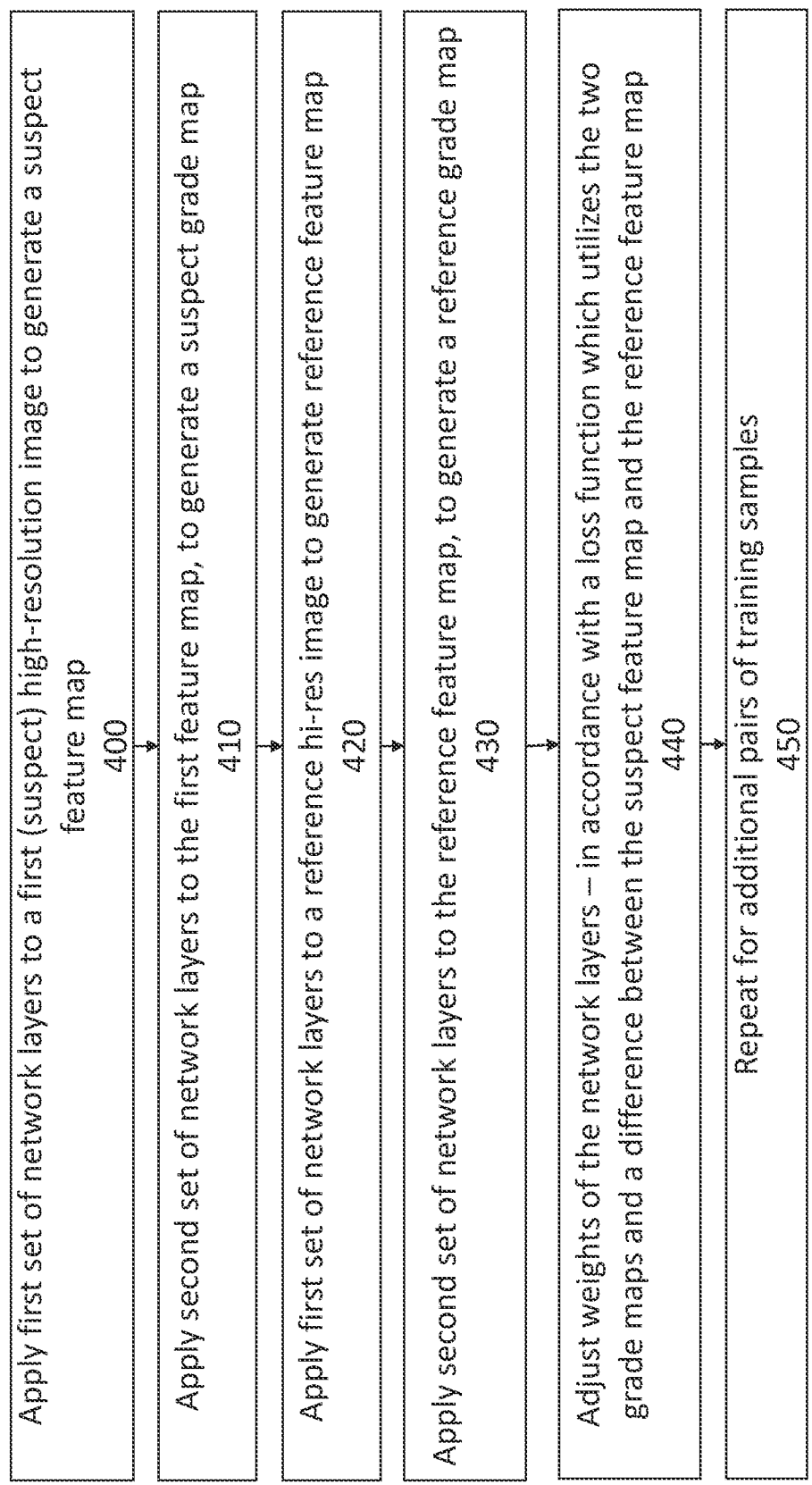

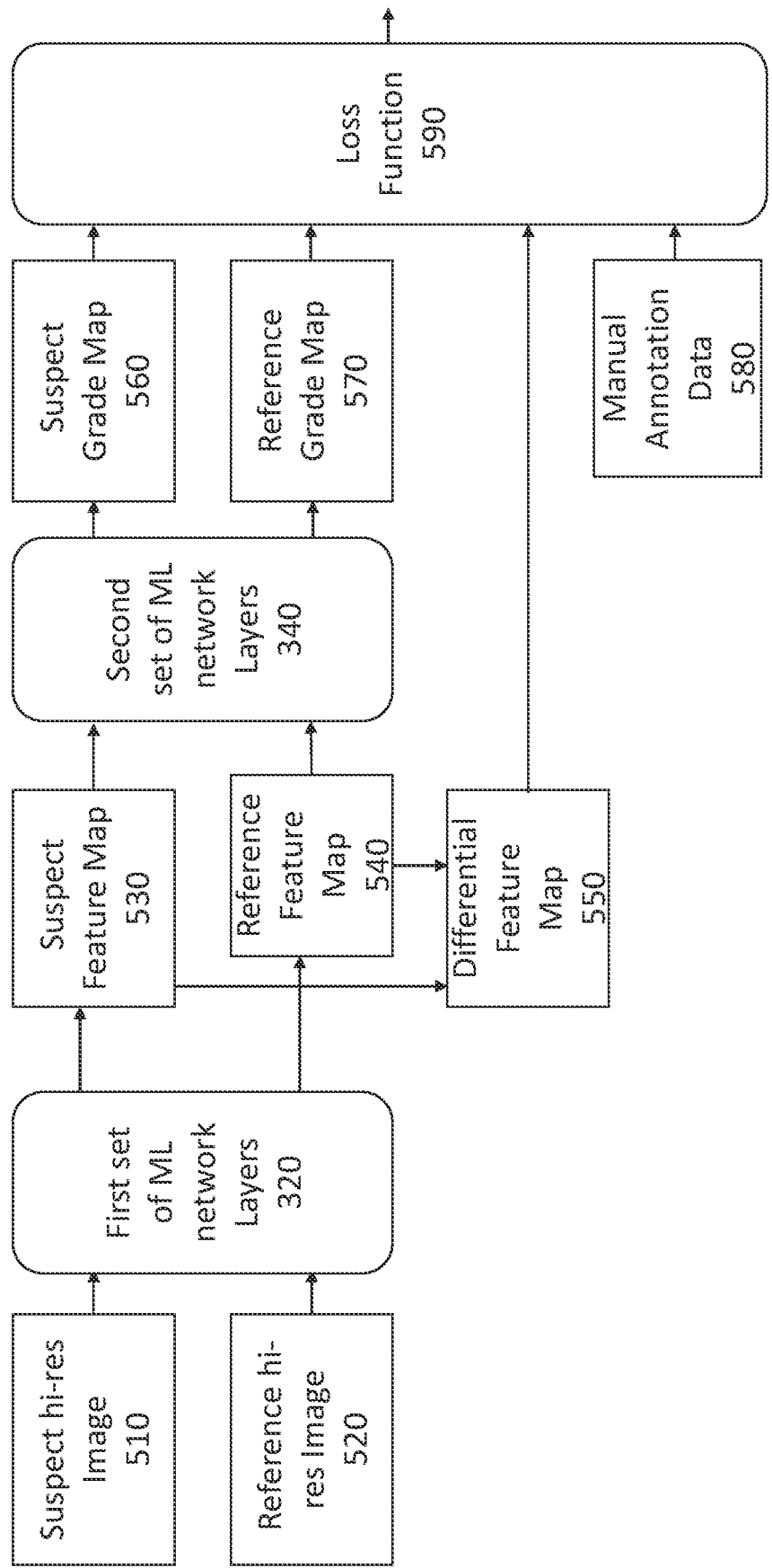

DETECTING DEFECTS IN SEMICONDUCTOR SPECIMENS USING WEAK LABELING

RELATED APPLICATIONS

This application is a continuation of U.S. patent application Ser. No. 16/892,139, filed Jun. 3, 2020, entitled "Detecting Defects In Semiconductor Specimens Using Weak Labeling," the contents of which are entirely incorporated by reference.

TECHNICAL FIELD

The presently disclosed subject matter relates, in general, to the field of examination of a wafer specimen, and, more specifically, to detecting defects in the specimen.

BACKGROUND

Current demands for high density and performance associated with ultra large scale integration of fabricated devices require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

By way of non-limiting example, run-time examination can employ a two phase procedure, e.g. inspection of a specimen followed by review of sampled locations of potential defects. During the first phase, the surface of a specimen is inspected at high-speed and relatively low-resolution. In the first phase, a defect map is produced to show suspected locations on the specimen having high probability of a defect. During the second phase at least some of the suspected locations are more thoroughly analyzed with relatively high resolution. In some cases, both phases can be implemented by the same inspection tool, and, in some other cases, these two phases are implemented by different inspection tools.

Examination processes are used at various steps during semiconductor fabrication to detect and classify defects on specimens. Effectiveness of examination can be increased by automatization of process(es) as, for example, Automatic Defect Classification (ADC), Automatic Defect Review (ADR), etc.

SUMMARY

According to one aspect of the presently disclosed subject matter there is provided a system of classifying a pattern of interest (POI) on a semiconductor specimen, the system comprising a processor and memory circuitry (PMC) configured to:
  obtain data informative of a high-resolution image of a POI on the specimen;
  generate data usable for classifying the POI in accordance with a defectiveness-related classification,
    wherein the generating utilizes a machine learning model that has been trained in accordance with, at least, a plurality of training samples, each training sample comprising:
      a high-resolution training image captured by scanning a respective training pattern on a specimen, the respective training pattern being similar to the POI,
      wherein the respective training pattern is associated with a label derivative of low-resolution inspection of the respective training pattern.

In addition to the above features, the system according to this aspect of the presently disclosed subject matter can comprise one or more of features (i) to (xiii) listed below, in any desired combination or permutation which is technically possible:
  (i) the high-resolution training image of each training sample of the plurality of training samples is a scanning electron microscope (SEM) image
  (ii) the label of each training sample of the plurality of training samples is derivative of optical inspection of the respective training patter
  (iii) the machine learning model comprises a neural network, the neural network comprising:
    a first series of one or more neural-net layers configured to, given input data informative of a high-resolution image of a POI, output a feature map, and
    a second series of neural net layers configured to, given an input feature map, output data indicative of at least one per-pixel-block classification score, wherein each per-pixel-block classification score pertains to a region of the POI that is represented by pixels of a respective pixel-block of the high-resolution image, the per-pixel-block classification score being indicative of a likelihood of defectiveness of the respective region,
    thereby giving rise to data usable for classifying the POI in accordance with a defectiveness-related classification;
  and wherein the machine learning model has been trained in accordance with:
    a) applying the first series of neural-network layers to a first high-resolution image of a first POI of a first training sample of the plurality of training samples, the first POI being associated with a label indicative of defectiveness, thereby giving rise, in accordance with a current training state of the neural network, to a suspect feature map;
    b) applying the second series of neural-network layers to the suspect feature map, thereby giving rise, in accordance with the current training state of the neural network, to data indicative of at least one suspect per-pixel-block score, wherein each suspect per-pixel-block score pertains to a region of the first POI that is represented by pixels of a respective pixel-block of the first high-resolution image, the suspect per-pixel-block score being indicative of a likelihood of defectiveness of the respective region;
    c) applying the first series of neural network layers to a second high-resolution image of a second POI, of a second training sample of the plurality of training samples, the second POI being associated with a label indicative of non-defectiveness, thereby giving rise, in accordance with the current training state of the neural network, to a reference feature map;
    d) applying the second series of neural network layers to the reference feature map, thereby giving rise, in accordance with the current training state of the neural network, to data indicative of at least one reference per-pixel-block score,
      wherein each reference per-pixel-block score pertains to a region of the second POI that is represented by pixels of a respective pixel-block of the second high-resolution image, the reference perpixel-block score being indicative of a likelihood of defectiveness of the respective region;
e) adjusting at least one weight of at least one layer of the first series and second series of neural network layers in accordance with a loss function utilizing, at least:
 a distance metric derivative of the suspect feature map and the reference feature map, the at least one suspect per-pixel-block score, and the at least one reference per-pixel-block score; and
f) repeating a)-e) for one or more additional first and second training samples of the plurality of training samples.
(iv) the neural network layers are convolutional layers
(v) the distance metric is in accordance with a Euclidean difference between the suspect feature map and the reference feature map
(vi) the distance metric is in accordance with a cosine similarity between the suspect feature map and the reference feature map
(vii) the additional second training samples are the same training sample
(viii) the loss function further utilizes:
annotation data associated with a group of pixels of the first high-resolution image, the annotation data being indicative of defectiveness of a region of the first POI represented by the group of pixels
(ix) the annotation data is derivative of human annotation of the high-resolution image
(x) comparing, by the processor, each score of the at least one per-pixel-block classification score to a defectiveness threshold, thereby giving rise to an indication of whether the POI is defective.
(xi) alerting an operator, by the processor, in accordance with the indication of whether the POI is defective.
(xii) determining, by the processor, a defect bounding box in accordance with at least one per-pixel-block classification score.
(xiii) the system further comprising:
low-resolution examination tools configured to capture a low-resolution image of a POI and utilize optical inspection of the low-resolution image to classify the POI in accordance with a defectiveness-related classification; and
high-resolution examination tools configured to capture the high-resolution image of the POI responsive to classification of the POI as defective by the low-resolution tools.

According to another aspect of the presently disclosed subject matter there is provided a method of classifying a pattern of interest (POI) on a semiconductor specimen from a high-resolution image of the pattern, the method comprising:
receiving, by a processor, data informative of a high-resolution image of a POI on the specimen; and generating, by the processor, data usable for classifying the POI in accordance with a defectiveness-related classification, wherein the generating utilizes a machine learning model that has been trained in accordance with, at least, a plurality of training samples, each training sample comprising:
 a high-resolution training image captured by scanning a respective training pattern on a specimen, the training pattern being similar to the POI, wherein the respective training pattern is associated with a label derivative of low-resolution inspection of the respective training pattern.

This aspect of the disclosed subject matter can optionally comprise one or more of features (i) to (xii) listed above with respect to the system, mutatis mutandis, in any desired combination or permutation which is technically possible.

According to another aspect of the presently disclosed subject matter there is provided a non-transitory program storage device readable by a processing and memory circuitry, tangibly embodying computer readable instructions executable by the processing and memory circuitry to perform a method of classifying a pattern of interest (POI) on a semiconductor specimen from a high-resolution image of the pattern, the method comprising:
receiving data informative of a high-resolution image of a POI on the specimen; and
generating data usable for classifying the POI in accordance with a defectiveness-related classification,
 wherein the generating utilizes a machine learning model that has been trained in accordance with, at least, a plurality of training samples, each training sample comprising:
 a high-resolution training image captured by scanning a respective training pattern on a specimen, the training pattern being similar to the POI,
 wherein the respective training pattern is associated with a label derivative of low-resolution inspection of the respective training pattern.

This aspect of the disclosed subject matter can optionally comprise one or more of features (i) to (xii) listed above with respect to the system, mutatis mutandis, in any desired combination or permutation which is technically possible.

According to another aspect of the presently disclosed subject matter there is provided a non-transitory program storage device readable by a processing and memory circuitry, tangibly embodying computer readable instructions executable by the processing and memory circuitry to perform a method of training a neural network to, given input data informative of a high-resolution image of a POI, generate data indicative of at least one per-pixel-block classification score, wherein each per-pixel-block classification score pertains to a region of the POI that is represented by pixels of a respective pixel-block of the high-resolution image, the per-pixel-block classification score being indicative of a likelihood of defectiveness of the respective region, thereby giving rise to data usable for classifying the POI in accordance with a defectiveness-related classification, wherein the training utilizes, at least, a plurality of training samples, each training sample comprising:
a high-resolution training image captured by scanning a respective training pattern on a specimen, the training pattern being similar to the POI,
 wherein the respective training pattern is associated with a label derivative of low-resolution inspection of the respective training pattern,
the method comprising:
a) applying a first series of neural network layers to a first high-resolution image of a first POI of a first training sample of the plurality of training samples, the first POI being associated with a label indicative of defectiveness, thereby giving rise, in accordance with a current training state of the neural network, to a suspect feature map;
b) applying a second series of neural network layers to the suspect feature map, thereby giving rise, in accordance with the current training state of the neural network, to data indicative of at least one suspect per-pixel-block score, wherein each suspect per-pixel-block score pertains to a region of the first POI that is represented by pixels of a respective pixel-block of the first high-resolution image, the suspect per-pixel-block score being indicative of a likelihood of defectiveness of the respective region;

c) applying the first series of neural network layers to a second high-resolution image of a second POI of a second training sample of the plurality of training samples, the second POI being associated with a label indicative of non-defectiveness, thereby giving rise, in accordance with the current training state of the neural network, to a reference feature map;

d) applying the second series of neural network layers to the reference feature map, thereby giving rise, in accordance with the current training state of the neural network, to data indicative of at least one reference per-pixel-block score, wherein each reference per-pixel-block score pertains to a region of the second POI that is represented by pixels of a respective pixel-block of the second high-resolution image, the reference per-pixel-block score being indicative of a likelihood of defectiveness of the respective region;

e) adjusting at least one weight of at least one layer of the first series and second series of neural network layers in accordance with a loss function, the loss function utilizing, at least:

a distance metric derivative of the suspect feature map and the reference feature map, the at least one suspect per-pixel-block score, and the at least one reference per-pixel-block score; and f) repeating a)-e) for one or more additional first and second training samples of the plurality of training samples.

This aspect of the disclosed subject matter can optionally comprise one or more of features (i) to (ix) listed above with respect to the system, mutatis mutandis, in any desired combination or permutation which is technically possible.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 4 illustrates an example method of training a machine learning model so that the model can receive an input SEM image of a POI and then generate data indicative of per-pixel-block scores usable for classifying the POI—in accordance with some embodiments of the presently disclosed subject matter.

FIG. 5. illustrates an example machine learning model and training data flow in accordance with some embodiments of the presently disclosed subject matter.

DETAILED DESCRIPTION OF THE DRAWINGS

Figure 1:
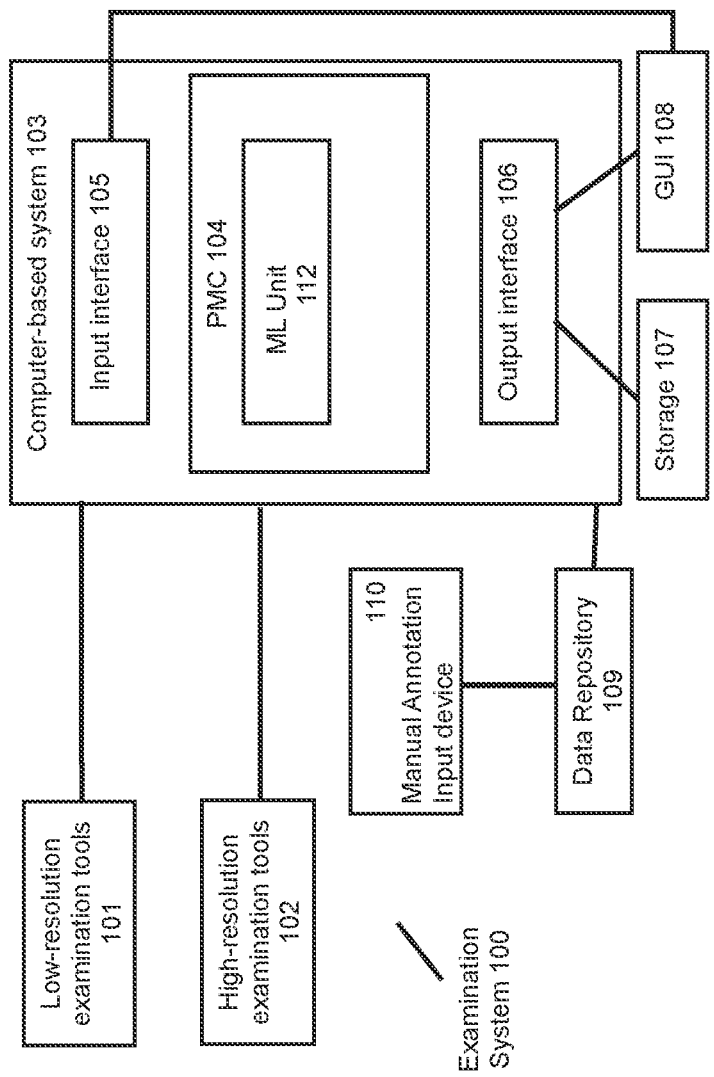
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "training", "obtaining", "generating", "computing", "utilizing", "feeding", "providing", "registering", "applying", "adjusting" or the like, refer to the action(s) and/or process(es) of a processor that manipulates and/or transforms data into other data, said data represented as physical, such as electronic, quantities and/or said data representing the physical objects. The term "processor" covers any computing unit or electronic unit with data processing circuitry that may perform tasks based on instructions stored in a memory, such as a computer, a server, a chip, a hardware processor, etc. It encompasses a single processor or multiple processors, which may be located in the same geographical zone or may, at least partially, be located in different zones and may be able to communicate together.

The terms "non-transitory memory" and "non-transitory medium" used herein should be expansively construed to cover any volatile or non-volatile computer memory suitable to the presently disclosed subject matter.

The term "defect" used in this specification should be expansively construed to cover any kind of abnormality or undesirable feature formed on or within a specimen.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different inspection tools. Likewise, examination can be provided prior to manufacture of the specimen to be examined and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes, atomic force microscopes, optical inspection tools, etc.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the computer for executing one or more methods of the invention.

Bearing this in mind, attention is drawn to FIG. 1, which illustrates a functional block diagram of an examination system in accordance with certain embodiments of the presently disclosed subject matter. The examination system 100 illustrated in FIG. 1 can be used for examination of a specimen (e.g. semiconductor specimen such as a wafer and/or parts thereof) as part of the specimen fabrication process. The illustrated examination system 100 comprises computer-based system 103 capable of automatically determining metrology-related and/or defect-related information using images of one or more specimens. System 103 can be operatively connected to one or more low-resolution examination tools 101 and/or one or more high-resolution examination tools 102 and/or other examination tools. The examination tools are configured to capture images of specimens and/or to review the captured image(s) and/or to enable or provide measurements related to the captured image(s). System 103 can be further operatively connected to data repository 109. Data repository 109 can be operatively connected to manual annotation input device 110 and can receive manual annotation data from it.

System 103 includes a processor and memory circuitry (PMC) 104. PMC 104 is configured to provide processing necessary for operating system 103, as further detailed in the various embodiments described hereinafter, and comprises a processor (not shown separately) and a memory (not shown separately). In FIG. 1, PMC 104 is operatively connected to a hardware-based input interface 105 and to a hardware-based output interface 106.

The processor of PMC 104 can be configured to execute several functional modules in accordance with computer-readable instructions implemented on a non-transitory computer-readable memory included in the PMC. Such functional modules are referred to hereinafter as comprised in the PMC. Functional modules comprised in PMC 104 can include a machine learning unit (ML unit) 112. ML unit 112 can be configured to enable data processing using a machine learning model/machine learning algorithm for outputting application-related data based on the images of specimens.

ML unit 112 can include a supervised or unsupervised machine learning model (for e.g. a deep neural network (DNN)). A machine learning model of ML unit 112 can include layers organized in accordance with a respective DNN architecture. By way of non-limiting example, the DNN layers can be organized in accordance with a Convolutional Neural Network (CNN) architecture, a Recurrent Neural Network architecture, a Recursive Neural Networks architecture, a Generative Adversarial Network (GAN) architecture, or otherwise. Optionally, at least some of the layers can be organized in a plurality of DNN sub-networks. Each layer of the machine learning model can include multiple basic computational elements (CE) typically referred to in the art as dimensions, neurons, or nodes. In some embodiments, the machine learning model can be a neural network wherein each layer is a neural network layer. In some embodiments, the machine learning model can be a convolutional neural network wherein each layer is a convolutional layer.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function, or other suitable function.

The output from a given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of the machine learning model can be initially selected prior to training, and can be further iteratively adjusted or modified during training to achieve an optimal set of weighting and/or threshold values in a trained ML network. After each iteration, a difference (also called loss function) can be determined between the actual output produced by machine learning model and the target output associated with the respective training set of data. The difference can be referred to as an error value. Training can be determined to be complete when a cost or loss function indicative of the error value is less than a predetermined value, or when additional iterations result in only limited improvement in performance. Optionally, at least some of the machine learning model subnetworks (if any) can be trained separately, prior to training the entire machine learning model network.

A set of machine learning model input data used to adjust the weights/thresholds of a neural network is referred to herein as a training set.

System 103 can be configured to receive, via input interface 105, input data which can include data (and/or derivatives thereof and/or metadata associated therewith) produced by the examination tools and/or data produced and/or stored in one or more data repositories 109 and/or another relevant data depository. It is noted that input data can include images (e.g. captured images, images derived from the captured images, simulated images, synthetic images, etc.) and associated scalar data (e.g. metadata, hand-crafted/manual image annotations, automatic attributes, etc.). It is further noted that image data can include data related to a layer of interest of the specimen and/or to one or more other layers of the specimen.

Upon processing the input data (e.g. low-resolution image data and/or high-resolution image data, optionally together with other data such as, for example, design data, synthetic data, inspection data etc.) system 103 can send, via output interface 106, the results (e.g. instruction-related data) to any of the examination tool(s), store the results (e.g. defect attributes, defect classification, etc.) in storage system 107, render the results via GUI 108 and/or send to an external system (e.g. to Yield Management System (YMS) of a FAB). GUI 108 can be further configured to enable user-specified inputs related to system 103.

By way of non-limiting example, one or more low-resolution examination tools 101 (e.g. an optical inspection system, low-resolution SEM, etc.) can examine a specimen. The low-resolution examination tools 101 can transmit resulting low-resolution image data (which can be informative of low-resolution images of the specimen) to system 103 (directly or via one or more intermediate systems). Alternatively, or additionally, high-resolution tools 102 can examine the specimen (e.g. a subset of potential defect locations selected for review based on low-resolution images can be subsequently reviewed by a scanning electron microscope (SEM) or Atomic Force Microscopy (AFM)). High-resolution tools 102 can transmit the resulting high-resolution image data (which can be informative of high-resolution images of the specimen) to system 103 (directly or via one or more intermediate systems).

It is noted that image data can be received and processed together with metadata (e.g. pixel size, text description of defect type, parameters of image capturing process, etc.) associated therewith.

In some embodiments, image data can be received and processed together with annotation data. By way of non-limiting example, a human reviewer can select a region (for example: a hand-marked elliptical region) and mark it as defective or with a label indicative of defectiveness. Manual or other annotation data can be utilized during training, as described hereinbelow.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

Without limiting the scope of the disclosure in any way, it should also be noted that the examination tools can be implemented as inspection machines of various types, such as optical imaging machines, electron beam inspection machines, and so on. In some cases, the same examination tool can provide low-resolution image data and high-resolution image data. In some cases, at least one examination tool can have metrology capabilities.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in another embodiment at least some of examination tools 101 and/or 102, data repositories 109, manual annotation input 110, storage system 107 and/or GUI 108 can be external to the examination system 100 and operate in data communication with system 103 via input interface 105 and output interface 106. System 103 can be implemented as stand-alone computer(s) to be used in conjunction with the examination tools. Alternatively, the respective functions of the system can, at least partly, be integrated with one or more examination tools.

Figure 2:
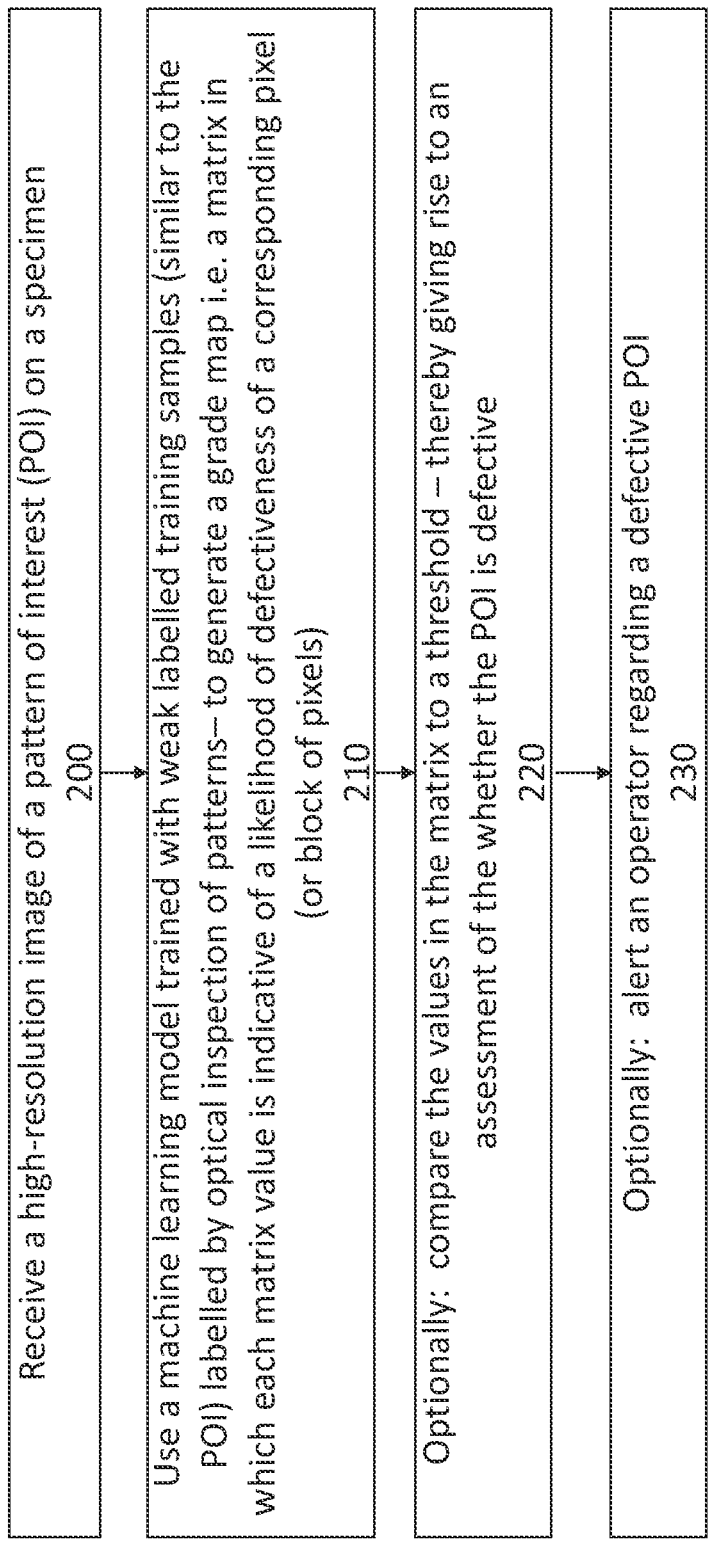
FIG. 2 illustrates a flow diagram describing an example method of classifying a pattern of interest (POI) on a semiconductor specimen in accordance with weak labels derivative of optical inspection—in accordance with certain embodiments of the presently disclosed subject matter.

Attention is now drawn to FIG. 2 which illustrates a flow diagram describing an example processor-based method of classifying a pattern of interest (POI) on a semiconductor specimen from a high-resolution image of the pattern—in accordance with certain embodiments of the presently disclosed subject matter.

In monitoring of semiconductor fabrication processes, it can be desirable to determine various data and metrics pertaining to manufactured specimens, and more specifically data and metrics pertaining to patterns on the specimens. These data/metrics can include: defect status of a pattern (e.g. defective/non-defective), region of defect (e.g. identification of a group of pixels of a high-resolution image representing a defective pattern), and level of certainty regarding the accuracy of determination of defectiveness.

These data can be determined by, for example, human annotation of high-resolution images. However, such annotation is costly and time consuming.

In some embodiments of the presently disclosed subject matter, defectiveness of the regions of a high-resolution image are determined using a machine learning model that was trained using a training set including "weakly-labeled" training samples—i.e. images with associated labels that apply (for example) to the image as a whole, and which—for example—derive from a low-resolution method of classification such as optical inspection. In the context of the present disclosure, "training" can include any suitable method of configuring a machine learning model—including: training methods such as the method described below with reference to FIG. 4, setting parameters of the model based on settings of another model trained using a training set using weakly labeled samples etc.

Among the advantages of some of these methods is that they can provide accurate assessments of pixel-region defectiveness based on easily attainable samples and without requiring annotation data.

The system 103 (for example: PMC 104) can receive (200) data informative of a high-resolution image (such as a scanning electron microscope (SEM) image) of a POI on a specimen.

Examination system 100 can be configured to enable system 103 (for example: PMC 104) to receive the image. In some embodiments: low-resolution examination tools 101 can be configured to capture a low-resolution image of a group of one or more specimens (e.g. wafers or dies) or portions of specimens, and in so doing capture low-resolution images of patterns of interest on the specimens. Low-resolution examination tools 101 can be further configured to utilize optical inspection (e.g. as known in the art) of the low-resolution image to classify patterns of the specimens in accordance with a defectiveness-related classification (e.g. defective/non-defective). High-resolution tools 102 can be configured to capture a high-resolution image (e.g. using a SEM) of a pattern of interest (POI) responsive to classification of the POI as defective by one or more low-resolution examination tools 101. High-resolution tools 102 can be further configured to provide the captured high-resolution image of the POI to system 103.

Computer-based system 103 (for example: PMC 104) can then generate (210) data indicative of, for each of at least one pixel-block of the high-resolution image, a score usable for classifying the POI in accordance with a defectiveness-related classification (such as defectiveness/non-defectiveness of a region of the POI or of the POI as a whole).

More specifically, in some embodiments—for example using methods described hereinbelow with reference to FIGS. 3-5—computer-based system 103 (for example: PMC 104) can generate data usable for classifying the POI in accordance with a defectiveness-related classification. In some embodiments, the data generated is informative of one or more scores (e.g. a matrix of scores) where each score is derived from a pixel-block of the high-resolution image, and is indicative of a likelihood of defectiveness (e.g. an estimation of likelihood of defectiveness) of a region of the POI represented by pixels of the pixel-block. Such a matrix is hereforward termed a "grade map".

In some embodiments, the grade map generated by system 103 (for example: ML model 112) has the same dimensions as the input high-resolution image of the POI, and the entries of the matrix are scalar values (for example between 0 and 1) which are indicative of a likelihood that the respective pixel of the input image of the POI corresponds to a defective region of the POI. In some other embodiments, the generated grade map is smaller than the image of the POI (for example: a 512×512 matrix can be generated from a 1024×1024 image, with each matrix entry containing a score of a respective 2×2 pixel block), and in this case the scalar values of the matrix are indicative of a likelihood that a respective block of pixels (for example a 2×2 or 4×4 block or another dimension of pixel block) of the POI image corresponds to a defective region of the POI. It is noted that the term "pixel block" in the present specification can include a single pixel as well as horizontal and/or vertical groups of pixels of various dimensions.

In some embodiments, the system 103 (for example: ML unit 112) generates the grade map by utilizing a machine learning model that has been trained in accordance with a set of training examples which are "weakly labeled" (e.g. images with associated labels that apply to the image as a whole). More specifically: in some such embodiments, each training example is a high-resolution image (or data informative of a high-resolution image) that was captured by scanning a training pattern that was similar to the POI. In some embodiments, the label that is associated with a training pattern is derived from optical inspection of the respective training pattern (or other low-resolution examination tools). For example, an optical inspection tool can inspect the pattern, compare the inspected pattern to a reference pattern, and label the inspected pattern as "defective" or "non-defective". An example method of training the machine learning model is described below, with reference to FIG. 4.

A wafer or die can be fabricated in a manner wherein multiple instances of a pattern are repeated on the wafer or die, and the wafer or die is then later separated into many device instances. In the present disclosure, the term "similar" in the context of one POI being similar to another should be broadly construed to include multiple instances of a pattern on a single wafer die, as well as to include multiple instances of a pattern across multiple instances of the same wafer or die, etc.

In some embodiments, the system 103 (for example: ML unit 112) can generate a data structure other than a grade map, that is nonetheless indicative of per-pixel (or per-pixel block) scores usable for classifying the POI in accordance with a defectiveness-related classification.

Optionally: the system 103 (for example: PMC 104) can next compare (220) (for example) each of the values in the grade map (or corresponding alternative data representation), to a defectiveness threshold (for example: 0.5 on a scale of 0 to 1), thereby giving rise to an indication of whether the POI is defective and also classifying the POI in accordance with a defectiveness-related classification (e.g. defective/non-defective).

Optionally the system 103 (for example: PMC 104) can take action if there is a score in the grade map which meets the defectiveness threshold. Optionally this action can include alerting (230) an operator in accordance with the indication of whether the POI is defective (or that a series or number of POIs is defective etc.)

In some embodiments, the grade map can be utilized to classify the POI in accordance with other defectiveness-related classifications. For example, the system 103 (for example: PMC 104) can determine a bounding box for a defect in accordance with the output per-pixel-block scores.

It is noted that the teachings of the presently disclosed subject matter are not bound by the flow chart illustrated in FIG. 2. It is also noted that whilst the flow chart is described with reference to elements of the system of FIG. 1 or 3, this is by no means binding, and the operations can be performed by elements other than those described herein.

Figure 3:
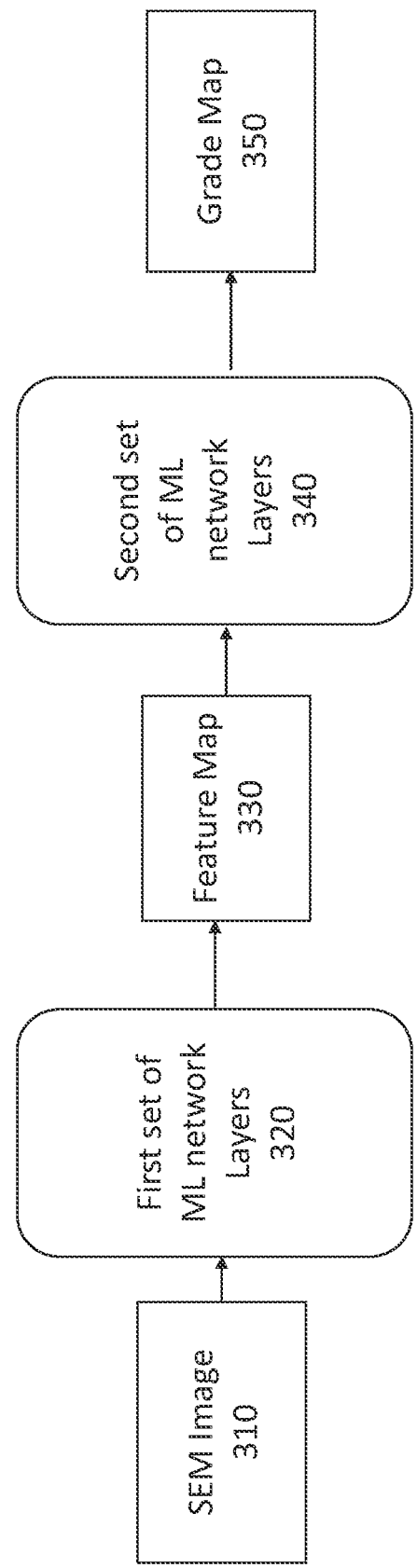
FIG. 3 illustrates example layers of a machine learning model usable for receiving data informative of SEM images (or other high resolution images) of a POI, and generating data indicative of per-pixel-block scores usable for classifying the POI with a defectiveness-related classification—in accordance with certain embodiments of the presently disclosed subject matter.

Attention is now drawn to FIG. 3. which illustrates example layers of a machine learning model usable for example, by PMC 104 (more specifically, for example: by ML unit 112) for receiving data informative of SEM images (or other high resolution images) of a POI, and generating data indicative of, for each of at least one pixel-block the image, a score usable for classifying the POI with a defectiveness-related classification—in accordance with certain embodiments of the presently disclosed subject matter.

The machine learning model can include a first series of machine learning network layers 320 (for example: neural network layers or convolutional neural network layers) which are configured to receive a SEM image (or another type of high-resolution image) 310 of a POI as input. The first series of machine learning network layers 320 can then generate, based on the SEM image 310, a feature map 330.

Feature map 330 can be an intermediate output of the machine learning network. In particular, as explained above, the machine learning network can comprise a plurality of layers $L_1$ to $L_N$, and the feature map 330 can be obtained as an output of layer $L_j$, with $1 \leq j \leq N$ (in some embodiments, the intermediate layers from layers $L_1$ to $L_j$, with $j < N$, can constitute a convolutional neural network). As mentioned above, in a machine learning model, each layer $L_j$ provides an intermediate output which is fed to the next layer $L_{j+1}$, until a final output is provided by the last layer $L_N$. Assume e.g. that SEM image 310 has dimensions $X_1$, $Y_1$, $Z_1$, wherein:

$X_1$ corresponds to a dimension of SEM image 310 according to a first axis X;

$Y_1$ corresponds to a dimension of SEM image 310 according to a second axis Y; and $Z_1$ corresponds to the number of value(s) associated with each pixel, wherein $Z_1 \geq 1$. For example, if a representation using three colors (red, green and blue) is used, then $Z_1=3$. This is not limitative and other representations can be used (e.g. in a SEM microscope, electrons are collected for each pixel by a plurality of different collectors each having a different location, and each channel corresponds to a dimension, therefore $Z_1$ is the total number of channels).

In some embodiments, feature map 330 has dimensions $X_2$, $Y_2$, $Z_2$, where $X_2 < X_1$, $Y_2 < Y_1$, and $Z_2 > Z_1$. $Z_2$ can depend on the number of filters present in layer $L_j$.

The machine learning model can include a second series of ML network layers 340 (for example: neural network layers, or convolutional neural network layers) which is configured to receive feature map 330 as input. Second series of ML network layers 340 can then generate—based on feature map 330—a grade map 350 for example conforming to the description appearing above with reference to FIG. 2.

It is noted that the teachings of the presently disclosed subject matter are not bound by the machine learning model layers described with reference to FIG. 3. Equivalent and/or modified functionality can be consolidated or divided in another manner and can be implemented in any appropriate combination of software with firmware and/or hardware and executed on a suitable device.

Attention is now drawn to FIG. 4, which illustrates an example method of training a machine learning model (for example: including a neural network with the structure described above with reference to FIG. 3) so that the machine learning model can receive an input high-resolution (e.g. SEM) image of a POI and then generate data indicative of, for each of at least one pixel-block of the image, a per-pixel-block classification score indicative of a likelihood of defectiveness of a region of the POI represented by pixels of the pixel-block. The per-pixel-block classification scores can be usable for classifying the POI in accordance with a defectiveness-related classification—in accordance with some embodiments of the presently disclosed subject matter. This description of the method illustrated in FIG. 4 makes reference to the training data flow illustrated in FIG. 5.

In some embodiments, PMC 104 (for example: ML Unit 112) trains the machine learning model using pairs of weakly-labeled (e.g. image-level labelled) training samples from a training set, wherein one training sample (termed a suspect training sample) includes a high-resolution image (e.g. SEM scan) of a POI that has been previously labeled as defective (or was suspected of being defective), and the second sample (termed a reference training sample) includes a high-resolution image (e.g. SEM scan) of a reference POI i.e. a POI that has been previously labeled (e.g. through earlier classification) as non-defective.

The labeling of the high-resolution images can derive from—for example—low-resolution (e.g. optical) inspection of the respective POI. Alternatively, the labeling of the high-resolution image can derive from human inspection or another suitable method.

In some embodiments, the training set consists entirely of training samples wherein the image-level labels are derived from optical inspection or other low-resolution examination tools. In some embodiments, the training set consists of such training samples as well as other training samples.

In some embodiments, some or all of the image-level-labelled training samples can be associated with annotation data. Annotation data can be derivative of, for example, human annotation (e.g. a human marking an ellipse around an area of a high-resolution image).

Annotation data can comprise data indicative of defectiveness (and, in some embodiments, type of defectiveness) of a portion of a specimen pattern that is represented by the annotated group of pixels of a high-resolution image. In this context, the term "group of pixels" can refer to a single pixel, or to the entire image. In this context, a portion of the specimen of the pattern can be regarded as represented by a specific group of pixels if, for example, the portion of the specimen is substantially or fully depicted by the group of pixels.

As will be described hereinbelow, in some embodiments the training method illustrated in FIG. 4 adjusts weights of the machine learning model layers in accordance with a loss function computed from a distance metric derivative of a suspect feature map (i.e. a feature map deriving from the image of the POI labeled as defective or suspect) and a reference feature map (i.e. a feature map deriving from the image of the POI labeled as non-defective).

The loss function can, in some embodiments, seek to maximize a difference between the two feature maps for feature map regions derived from pixels representing defective parts of the POI, and seek to minimize a difference between the two feature maps for feature map regions derived from pixels representing non-defective parts of the POI.

The loss function, in some embodiments, thereby constitutes an attention mechanism. The first series of machine learning model layers can generate feature maps which can identify semantic regions, and the second series of machine learning model layers can score the regions for likelihood of defectiveness.

PMC 104 (for example: ML unit 112) can apply (400) the first series of neural network layers 320 to a high-resolution image 510 of a POI that is associated with a label indicative of defectiveness (e.g. determined or suspected defectiveness). In some embodiments, the label indicative of defectiveness was associated with the image because optical inspection indicated defectiveness of the POI. The first series of neural network layers 320 can then generate a feature map 530 from the high-resolution image. The feature map is generated in accordance with the current training state of the neural network—so, as training progresses, the resulting feature map will change in accordance with the progress of the machine learning model training. A feature map generated from an image associated with a label indicative of defectiveness is herein termed a "suspect feature map".

PMC 104 (for example: ML unit 112) can then apply (410) the second series of neural network layers 340 to suspect feature map 530. The second series of neural network layers 340 then can generate grade map 560 (e.g. a score for each of one or more pixel-blocks of the high-resolution image 510, where each score is indicative of a likelihood of defectiveness of the region of the first POI represented by pixels of the pixel-block). A score output for a pixel-block of an image can be termed a per-pixel-block score, and a grade map can thus be referred to as a group of per-pixel-block scores. The grade map is generated in accordance with the current training state of the neural network—so, as training progresses, the resulting grade map will change in accordance with the progress of the machine learning model training. The grade map generated from the suspect feature map is herein termed a "suspect grade map".

PMC 104 (for example: ML unit 112) can next apply (420) the first series of neural network layers 320 to a high-resolution image 520 of a POI that is associated with a label indicative of non-defectiveness. In some embodiments, the label was associated with the image because the image was determined (e.g. by optical inspection) to be non-defective, or was otherwise determined or presumed to be non-defective. The first series of neural network layers 320 then can generate a feature map 540 from high-resolution image 520 (as calculated in accordance with the current training state of the machine learning model). A feature map generated from an image associated with a label indicative of non-defectiveness is herein termed a "reference feature map".

PMC 104 (for example: ML unit 112) can then apply (430) the second series of neural network layers 340 to reference feature map 540. The second series of neural network layers 340 then can generate reference grade map 570 (e.g. a score for each of one or more pixel-blocks of reference image 520, where each score indicates a likelihood of defectiveness of the region of the reference POI represented by pixels of the pixel-block) as calculated in accordance with the current training state of the machine learning model.

PMC 104 (for example: ML unit 112) can then adjust weights (e.g. at least one weight of at least one layer, or e.g.

all weights of all layers) of the first series 320 and second series 340 of neural network layers in accordance with a loss function. For example, PMC 104 (for example: ML unit 112) can compute (440) a loss function 590 and employ e.g. backpropagation to adjust the weights of the first series of neural network layers 320 and the second series of neural network layers 340.

In some embodiments, loss function 590 utilizes, at least, a distance metric (e.g. a value or group of values representing the difference between reference feature map 540 and suspect feature map 530), suspect grade map 560, and reference grade map 570. In some embodiments, the distance metric can be a differential feature map based on e.g. Euclidean distance or cosine similarity, as described hereinbelow.

In some embodiments, differential feature map 550 can be in accordance with a Euclidean distance between reference feature map 540 and suspect feature map 530. For example: differential feature map 550 can be computed by calculating the Euclidean distance between reference feature map 540 and suspect feature map 530 (i.e. in this case differential feature map 550 is a matrix where each entry is the arithmetic difference between the corresponding entries in the two feature maps).

In other embodiments, differential feature map 550 can be in accordance with the cosine similarity between a value in reference feature map 540 and a corresponding value in suspect feature map 530. For example: differential feature map 550 can be a matrix in which each entry is computed by calculating the cosine similarity between a value in reference feature map 540 and a corresponding value in suspect feature map 530.

In other embodiments, differential feature map 550 can be a different representation of the difference between suspect feature map 530 and reference feature map 540. In other embodiments, loss function 590 can use a different distance metric representative of the difference between suspect feature map 530 and reference feature map 540.

Optionally, as indicated above, in some embodiments, annotation data 580 can be available. Annotation data can include data indicative of a specific group of pixels in suspect image 510 having correspondence to a defective region of the respective POI. In such embodiments, loss function 590 can utilize annotation data 580 together with differential feature map 550, reference grade map 570, and suspect grade map 560.

PMC 104 (for example: ML unit 112) can repeat (450) the application of the two series of neural network layers 320 340 to additional pairs of training samples of the plurality of training samples, and can—for each pair of samples—adjust weights of the neural network layers in accordance with a loss function utilizing a distance metric such as differential feature map 550, suspect grade map 560, and reference grade map 570. For example, PMC 104 (for example: ML unit 112) can train using all available suspect training samples, and in conjunction with each suspect training sample PMC 104 (for example: ML unit 112) can utilize a reference training sample from the set of training samples. In some embodiments, PMC 104 (for example: ML unit 112) utilizes the same reference training sample in each training repetition.

It is noted that the teachings of the presently disclosed subject matter are not bound by the flow chart illustrated in FIG. 4, and that the illustrated operations can occur out of the illustrated order. For example, operations 400 and 420 shown in succession can be executed substantially concurrently, or in the reverse order. It is also noted that whilst the flow chart is described with reference to elements of the system of FIG. 1, neural network layers of FIG. 3, and data flow of FIG. 5, this is by no means binding, and the operations can be performed by elements other than those described herein.

It is noted that the teachings of the presently disclosed subject matter are not bound by the data flow described with reference to FIG. 5. Equivalent and/or modified functionality can be consolidated or divided in another manner and can be implemented in any appropriate combination of software with firmware and/or hardware and executed on a suitable device.

As noted above, training the machine learning model in this manner (e.g. using a suspect image as well as a reference image, and utilizing an attention mechanism based on the differential feature map), can enable fast training and provide high classification accuracy.

Update of the weights can use techniques such as feedforward/backpropagation methods, and can rely on any optimizer (e.g. Stochastic Gradient Descent—SGD, ADAM, etc.).

It is noted that the reference image 520 is an image of a reference area of a specimen (e.g. die, cell, etc.), wherein the respective image data represent the reference area that is clear of defects. The reference image can be an image captured from a reference (golden) die, reference cell, or other area verified as being clear of defects. Alternatively, or additionally, the reference image can be simulated using CAD data and/or can be augmented after capturing to exclude defects (if any) in the reference area.

It is further noted that in some embodiments the suspect image 510 is comparable (e.g. die-to-die, cell-to-cell, die-to-database, etc.) with the reference image 520 and is informative of a first area of a semiconductor specimen. The first image is supposed to be informative of a plurality of defects associated with the first area. The first image can be an image captured from the first area. Optionally, the first image can be further augmented and/or can comprise synthetic defects introduced after capturing. The first area is configured to meet a similarity criterion with regard to the reference area and can belong to the same or to a different semiconductor specimen. The similarity criterion can define, for example, that the first area and the reference area correspond to the same physical components or to similar zones of the semiconductor specimen (e.g. similar dies, cells, etc.).

It is noted that, in some embodiments, in order to ensure compatibility between the images, the at least one reference image 520 and the first image 510 in the training sample have to undergo a registration procedure. It is further noted that at least part of different training samples can comprise the same reference image.

It is to be noted that the various features described in the various embodiments may be combined according to all possible technical combinations. It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter. Those skilled in the art will readily appreciate that various modifications and changes can be applied to the embodiments of the invention as hereinbefore described without departing from its scope, defined in and by the appended claims.

What is claimed is:

1. A system for classifying a pattern of interest (POI) on a semiconductor specimen, the system comprising a processor and memory circuitry (PMC) configured to:
obtain data informative of a high-resolution image of the POI on the specimen; and
generate data usable for classifying the POI in accordance with a defectiveness-related classification,
wherein the generating utilizes a machine learning model that has been trained with, at least, a plurality of training samples, each training sample obtained by:
capturing a high-resolution training image by scanning, with a high-resolution examination tool, a respective training pattern on a specimen, the respective training pattern being similar to the POI, and
associating a label with the high-resolution training image, the label being derivative of low-resolution inspection of the respective training pattern.

2. The system of claim 1, wherein the high-resolution examination tool is a scanning electron microscope (SEM).

3. The system of claim 1, wherein the respective label associated with each training sample of the plurality of training samples is derivative of optical inspection of the respective training pattern.

4. The system of claim 1, further comprising:
one or more low-resolution examination tools configured to capture a low-resolution image of the POI and utilize optical inspection of the low-resolution image to classify the POI in accordance with the defectiveness-related classification; and
one or more high-resolution examination tools configured to capture the high-resolution image of the POI responsive to classification of the POI as defective by the one or more low-resolution examination tools.

5. The system of claim 1, wherein the machine learning model comprises a neural network, the neural network comprising:
a first series of one or more neural network layers configured to, given input data informative of the high-resolution image of the POI, output a feature map, and
a second series of one or more neural network layers configured to, given an input of the feature map, generate data indicative of at least one per-pixel-block classification score,
wherein each per-pixel-block classification score pertains to a region of the POI that is represented by pixels of a respective pixel-block of the high-resolution image, the per-pixel-block classification score being indicative of a likelihood of defectiveness of the respective region, producing data usable for classifying the POI in accordance with the defectiveness-related classification.

6. The system of claim 5, wherein the machine learning model has been trained with:
a) applying the first series of one or more neural network layers to a first high-resolution training image of a first POI of a first training sample of the plurality of training samples, the first POI being associated with a label indicative of defectiveness, to produce, in accordance with a current training state of the neural network, a suspect feature map;
b) applying the second series of one or more neural network layers to the suspect feature map, to produce, in accordance with the current training state of the neural network, data indicative of at least one suspect per-pixel-block classification score,
wherein each suspect per-pixel-block classification score pertains to a region of the first POI that is represented by pixels of a respective pixel-block of the first high-resolution training image, the suspect per-pixel-block classification score being indicative of a likelihood of defectiveness of the respective region;
c) applying the first series of one or more neural network layers to a second high-resolution training image of a second POI of a second training sample of the plurality of training samples, the second POI being associated with a label indicative of non-defectiveness, to produce, in accordance with the current training state of the neural network, a reference feature map;
a) applying the second series of one or more neural network layers to the reference feature map, to produce, in accordance with the current training state of the neural network, data indicative of at least one reference per-pixel-block score,
d) wherein each reference per-pixel-block classification score pertains to a region of the second POI that is represented by pixels of a respective pixel-block of the second high-resolution training image, the reference per-pixel-block classification score being indicative of a likelihood of defectiveness of the respective region;
e) adjusting at least one weight of at least one layer of the first series and second series of one or more neural network layers in accordance with a loss function, the loss function being in accordance with, at least:
a distance metric derivative of the suspect feature map and the reference feature map,
the at least one suspect per-pixel-block classification score, and
the at least one reference per-pixel-block classification score; and
f) repeating a)-e) for one or more additional first and second training samples of the plurality of training samples.

7. The system of claim 5, wherein the first series and second series of one or more neural network layers are convolutional layers.

8. The system of claim 5, wherein the PMC is further configured to: compare each of the at least one per-pixel-block classification score to a defectiveness threshold, providing an indication of whether the POI is defective.

9. The system of claim 8, wherein the PMC is further configured to: alert an operator in accordance with the indication of whether the POI is defective.

10. A method of classifying a pattern of interest (POI) on a semiconductor specimen from a high-resolution image of the pattern, the method performed by a processor and memory circuitry (PMC), the method comprising:
receiving data informative of a high-resolution image of a POI on the specimen; and
generating data usable for classifying the POI in accordance with a defectiveness-related classification,
wherein the generating utilizes a machine learning model that has been trained with, at least, a plurality of training samples, each training sample obtained by:
capturing a high-resolution training image by scanning, with a high-resolution examination tool, a respective training pattern on a specimen, the training pattern being similar to the POI, and associating the respective training pattern with a label derivative of low-resolution inspection of the respective training pattern.

11. The method of claim 10, wherein the machine learning model comprises a neural network, the neural network comprising:

a first series of one or more neural network layers configured to, given input data informative of the high-resolution image of the POI, output a feature map, and a second series of neural network layers configured to, given an input of the feature map, generate data indicative of at least one per-pixel-block classification score, wherein each per-pixel-block classification score pertains to a region of the POI that is represented by pixels of a respective pixel-block of the high-resolution image, the per-pixel-block classification score being indicative of a likelihood of defectiveness of the respective region, producing data usable for classifying the POI in accordance with the defectiveness-related classification.

12. The method of claim 11, wherein the machine learning model has been trained with a method comprising:

a) applying the first series of neural network layers to a first high-resolution training image of a first POI of a first training sample of the plurality of training samples, the first POI being associated with a label indicative of defectiveness, to produce, in accordance with a current training state of the neural network, a suspect feature map;

b) applying the second series of neural network layers to the suspect feature map, to produce, in accordance with the current training state of the neural network, data indicative of at least one suspect per-pixel-block classification score, wherein each suspect per-pixel-block classification score pertains to a region of the first POI that is represented by pixels of a respective pixel-block of the first high-resolution training image, the suspect per-pixel-block classification score being indicative of a likelihood of defectiveness of the respective region;

c) applying the first series of neural network layers to a second high-resolution training image of a second POI of a second training sample of the plurality of training samples, the second POI being associated with a label indicative of non-defectiveness, to produce, in accordance with the current training state of the neural network, a reference feature map;

d) applying the second series of neural network layers to the reference feature map, to produce, in accordance with the current training state of the neural network, data indicative of at least one reference per-pixel-block classification score, wherein each reference per-pixel-block classification score pertains to a region of the second POI that is represented by pixels of a respective pixel-block of the second high-resolution training image, the reference per-pixel-block classification score being indicative of a likelihood of defectiveness of the respective region;

e) adjusting at least one weight of at least one layer of the first series and second series of neural network layers in accordance with a loss function, the loss function utilizing, at least:

a distance metric derivative of the suspect feature map and the reference feature map, the at least one suspect per-pixel-block classification score, and the at least one reference per-pixel-block classification score; and f) repeating a)-e) for one or more additional first and second training samples of the plurality of training samples.

13. The method of claim 11, the method further comprising:

comparing each score of the at least one per-pixel-block classification score to a defectiveness threshold, providing an indication of whether the POI is defective.

14. The method of claim 13, further comprising: alerting an operator in accordance with the indication of whether the POI is defective.

15. The method of claim 11, further comprising determining a defect bounding box in accordance with the at least one per-pixel-block classification score.

16. A computer program product comprising a non-transitory computer-readable storage medium containing program instructions, which program instructions when read by a processor, cause the processor to perform a method of training a machine learning model to, given input data informative of a high-resolution image of a POI, generate data usable for classifying the POI in accordance with a defectiveness-related classification, the method comprising:

a) obtaining a plurality of training samples, each training sample obtained by:

capturing a high-resolution training image by scanning, with a high-resolution examination tool, a respective training pattern on a specimen, the training pattern being similar to the POI, and associating the respective training pattern with a label derivative of low-resolution inspection of the respective training pattern; and b) training the machine learning model with the plurality of training samples.

17. The computer program product of claim 16, wherein the machine learning model comprises a neural network, the neural network comprising:

a first series of one or more neural network layers configured to, given input data informative of the high-resolution image of the POI, output a feature map, and a second series of neural network layers configured to, given an input of the feature map, generate data indicative of at least one per-pixel-block classification score, wherein each per-pixel-block classification score pertains to a region of the POI that is represented by pixels of a respective pixel-block of the high-resolution image, the per-pixel-block classification score being indicative of a likelihood of defectiveness of the respective region, producing data usable for classifying the POI in accordance with the defectiveness-related classification.

18. The computer program product of claim 17, wherein the training the machine learning model comprises:

a) applying a first series of neural network layers to a first high-resolution training image of a first POI of a first training sample of the plurality of training samples, the first POI being associated with a label indicative of defectiveness, to produce, in accordance with a current training state of the neural network, to a suspect feature map;

b) applying a second series of neural network layers to the suspect feature map, to produce, in accordance with the current training state of the neural network, to data indicative of at least one suspect per-pixel-block classification score, wherein each suspect per-pixel-block classification score pertains to a region of the first POI that is represented by pixels of a respective pixel-block of the first high-resolution training image, the suspect per-pixel-block classification score being indicative of a likelihood of defectiveness of the respective region;

c) applying the first series of neural network layers to a second high-resolution training image of a second POI of a second training sample of the plurality of training samples, the second POI being associated with a label indicative of non-defectiveness, to produce, in accordance with the current training state of the neural network, a reference feature map;

d) applying the second series of neural network layers to the reference feature map, to produce, in accordance with the current training state of the neural network, to data indicative of at least one reference per-pixel-block classification score, wherein each reference per-pixel-block classification score pertains to a region of the second POI that is represented by pixels of a respective pixel-block of the second high-resolution image, the reference per-pixel-block classification score being indicative of a likelihood of defectiveness of the respective region;

e) adjusting at least one weight of at least one layer of the first series and second series of neural network layers in accordance with a loss function, the loss function utilizing, at least:
   a distance metric derivative of the suspect feature map and the reference feature map,
   the at least one suspect per-pixel-block classification score, and
   the at least one reference per-pixel-block classification score; and f) repeating a)-e) for one or more additional first and second training samples of the plurality of training samples.

19. The computer program product of claim 18, wherein the distance metric is a differential map calculated in accordance with a Euclidean difference between the suspect feature map and the reference feature map or calculated in accordance with a cosine similarity between the suspect feature map and the reference feature map.

20. The computer program product of claim 18, wherein the loss function further utilizes:
   annotation data associated with a group of pixels of the first high-resolution training image, the annotation data being indicative of defectiveness of a region of the first POI represented by the group of pixels.

* * * * *